(12) United States Patent
Hill

(10) Patent No.: US 7,458,640 B1
(45) Date of Patent: Dec. 2, 2008

(54) ADJUSTABLE VEHICLE HEADREST ASSEMBLY

(76) Inventor: Gregory C. Hill, 101 Courtyard Way, Enterprise, AL (US) 36330

( * ) Notice: Subject to any disclaimer, the term of this patent is extended or adjusted under 35 U.S.C. 154(b) by 0 days.

(21) Appl. No.: 11/232,348

(22) Filed: Sep. 22, 2005

(51) Int. Cl.
*A47C 1/10* (2006.01)

(52) U.S. Cl. ...................... 297/410; 297/408

(58) Field of Classification Search ............ 297/408, 297/410
See application file for complete search history.

(56) References Cited

U.S. PATENT DOCUMENTS

| | | | |
|---|---|---|---|
| 4,560,202 A * | 12/1985 | Koelle et al. ............ | 297/410 |
| 4,596,403 A * | 6/1986 | Dieckmann et al. ....... | 280/751 |
| 4,711,494 A * | 12/1987 | Duvenkamp ............. | 297/403 |
| 4,822,102 A * | 4/1989 | Duvenkamp ............. | 297/403 |
| 5,346,277 A | 9/1994 | Holobaugh et al. | |
| 5,669,668 A * | 9/1997 | Leuchtmann ............ | 297/408 |
| 5,722,728 A * | 3/1998 | De Filippo ............. | 297/408 |
| D401,455 S | 11/1998 | Pate | |
| 6,050,633 A | 4/2000 | Droual | |
| 6,192,565 B1 * | 2/2001 | Tame .................. | 297/61 |
| 6,279,996 B1 | 8/2001 | Albrecht | |
| 6,460,931 B2 | 10/2002 | Beck | |
| 6,726,283 B2 | 4/2004 | Schambre et al. | |

\* cited by examiner

*Primary Examiner*—David Dunn
*Assistant Examiner*—Erika Garrett

(57) ABSTRACT

A vehicle headrest assembly includes a vehicle seat including a vertically oriented back rest. A headrest is conjoined to the back rest that is adaptable between raised and lowered positions when a transmission gear shifter is biased between forward and reverse positions. The headrest is permanently affixed to the automatic adapting mechanism. A mechanism is included for automatically adapting the headrest between raised and lowered positions when the vehicle is selectively biased between the forward and reverse driving positions. The automatic adapting mechanism is power operated and electrically coupled to an internal power supply source of the vehicle. The automatic adapting mechanism is operably connected to the transmission gear shifter such that the headrest automatically biases between the raised and lowered positions without requiring the driver to manually reposition the headrest while transitioning the vehicle between forward and the reverse positions.

12 Claims, 3 Drawing Sheets

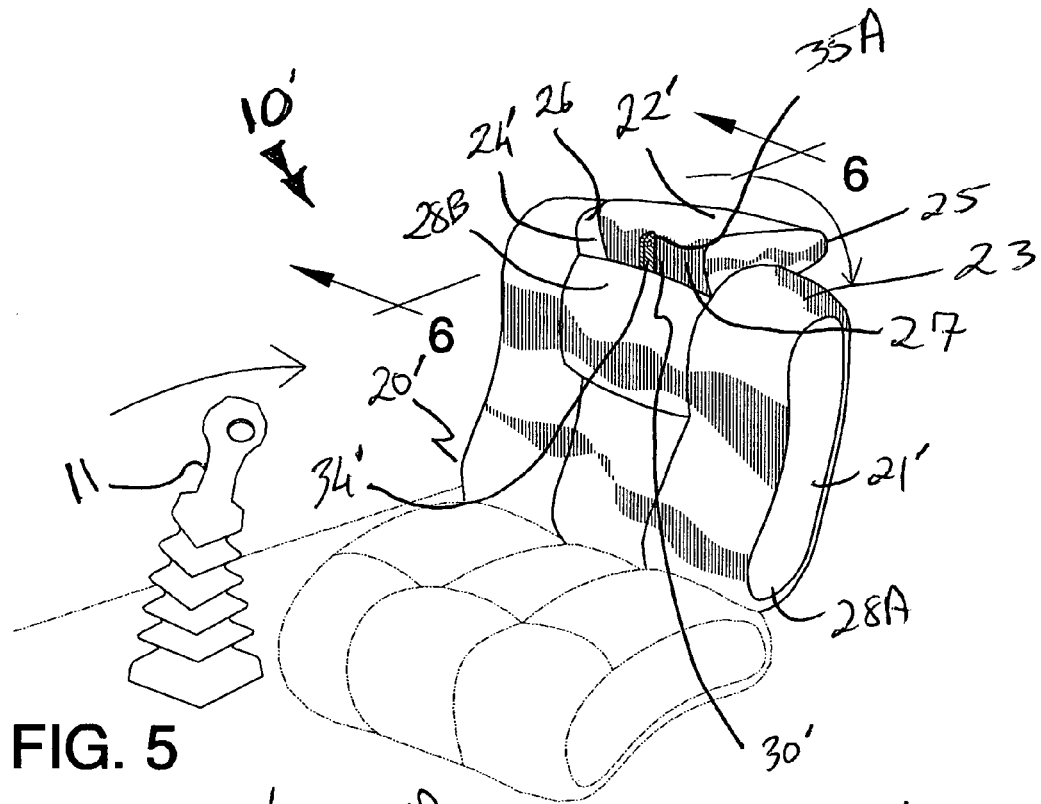
FIG. 5
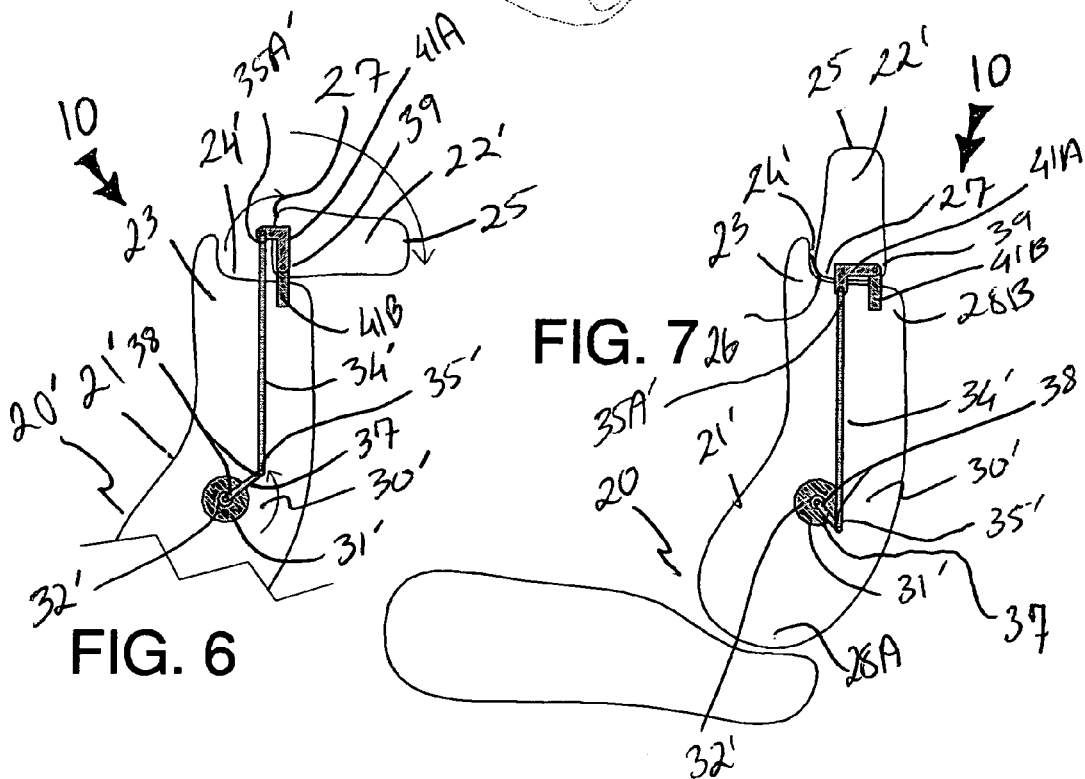
FIG. 6
FIG. 7

ADJUSTABLE VEHICLE HEADREST ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle headrests and, more particularly, to an adjustable vehicle headrest assembly.

2. Prior Art

When driving a vehicle in a backwards fashion, it is of utmost importance to have an optimum line of sight out of the rear of the car. It is well known that poor rearward visibility is virtually inherent with the design of most automobiles, the exception perhaps being convertible vehicles, and thus vehicle operators must use great caution when moving backwards in their car. Often turning one's head to the side and pivoting the upper body results in an improved line of sight, although this is not the desired way of reversing one's automobile. Law, in most states, dictates that one should use the rear view mirror and side rearview mirrors while backing one's car into or out of a certain location.

Vehicle operators quickly find that this is more difficult to do than it would seem, since the mirrors tend to small and offer a limited view of the surroundings behind the vehicle. This practice is only further hindered by vehicle headrests that can also obstruct a person direct line of sight in the rearview mirror. If such headrests can temporarily be removed or displaced to a more convenient location the practice of safely backing up one's car can only be improved. Adjustable headrests are known in the prior art.

One example discloses a headrest arrangement that provides a transversely subdivided, two-piece headrest forming two angles as viewed from the side and is capable of swinging about a fixed backrest pivot between an operating position in which it extends substantially as a continuation of the backrest and a storage position in which it either rests on a storage shelf behind the backrest or rests in a depression when the two pieces are at their maximum separation.

Apart from the fact that this conventional arrangement requires a special configuration of the storage shelf to provide a depression, with the result that the storage shelf cannot be configured in the normal way for its usual function, the design of the headrest itself is complicated by its two-piece construction and by the relative mobility of the two pieces. In this arrangement, the two-piece construction of the headrest is provided to permit vertical adjustment of the headrest regardless of its proximity to the head of the vehicle occupant to be protected which can be adjusted by inclination of the headrest.

Another conventional headrest arrangement has a backrest formed with a flat depression into which the headrest fits in its storage position. The headrest can be swung upward from the storage position into its operating position about a fixed axis, for example, in response to activation of an electric switch integrated in the seat cushion. The upward swinging motion is motorized by a pinion-and-sector drive connection. A disadvantage of this prior art arrangement, which has a one-piece headrest structure in contrast to the two-piece structure described in the reference discussed above, is that the height of the headrest cannot be adjusted and thereby adapted to the head position of a particular occupant.

Accordingly, a need remains for an adjustable vehicle headrest assembly in order to overcome the above-noted shortcomings. The present invention satisfies such a need by providing a headrest that is convenient to use, increases the safety with which the vehicle can be operated and is automatic in function. Instead of struggling to see rearward when reversing, the headrest retracts within the vehicle seat to provide an improved view for the driver. Such clear rearward visibility provides peace of mind for safety-conscious drivers and helps prevent low-speed accidental taps into other parked cars, posts, and bicycles. The assembly also helps to prevent parents from inadvertently backing over their small, hidden children, which can cause serious injury or possible death.

BRIEF SUMMARY OF THE INVENTION

In view of the foregoing background, it is therefore an object of the present invention to provide an adjustable vehicle headrest assembly. These and other objects, features, and advantages of the invention are provided by a power operated vehicle headrest assembly selectively adjustable between a plurality of alternate positions.

The vehicle headrest assembly includes a vehicle seat including a vertically oriented back rest. A headrest is directly conjoined to the back rest and is selectively and conveniently adaptable between raised and lowered positions when a transmission gear shifter of the vehicle is biased between forward and reverse driving positions. The back rest preferably has a chamfered top end provided with a groove that is centrally registered therewith. Such a groove is suitably sized and shaped for effectively receiving and housing the headrest therein. The headrest is completely intercalated within the top end of the back seat such that a top edge of the headrest lays horizontally flush with a top opening of the groove. Such a headrest is permanently affixed to the automatic adapting mechanism (described herein below).

A mechanism is included for advantageously automatically adapting the headrest between the raised and lowered positions when the vehicle is selectively biased between the forward and reverse driving positions so that a driver can effectively monitor surrounding driving conditions through a rear view window of the vehicle without having to manually recline the headrest. Such an automatic adapting mechanism is power operated and electrically coupled to an internal power supply source of the vehicle. The automatic adapting mechanism is directly and operably connected to the transmission gear shifter such that the headrest conveniently automatically biases between the raised and lowered positions without requiring the driver to manually reposition the headrest while transitioning the vehicle between the forward and the reverse positions.

Such an automatic adapting mechanism may include an electric motor that is selectively rotatable about clockwise and counter clockwise directions. The motor includes a drive shaft oriented orthogonal to a vertical path along which the headrest is displaced within the groove. The automatic adapting mechanism further preferably includes at least one switch operably mated to the transmission gear shifter. Such a switch generates and transmits a control signal to the electric motor when the vehicle is adapted between the forward and reverse positions.

An elongated and curvilinear guide rail is seated within the back rest and has a top end protruding upwardly through a bottom surface of the groove. Such a top end is directly conjoined to the headrest. A hollow track is formed within the back rest and extends along a curvilinear path from a bottom of the back rest upwardly to the groove such that the groove and the track are in fluid communication with each other. The guide rail is interfitted within the track and is operably conjoined directly to the electric motor in such a manner that the guide rail effectively becomes vertically offset within the track for causing the headrest to adapt between the raised and lowered positions respectively.

In an alternate embodiment the automatic adapting mechanism may also include an elliptical motor that is selectively rotatable about clockwise and counter clockwise directions. Such a motor includes a drive shaft oriented orthogonal to a vertical path along which the headrest is effectively displaced within the groove. The elliptical motor further includes an actuator arm that has a linear shape and is provided with axially opposed end portions directly conjoined to the drive shaft and radially terminates away therefrom respectively. An elongated shaft is included that has a longitudinal length greater than a longitudinal length of the actuator arm. Such a shaft has axially opposed end portions directly conjoined to the actuator arm and protrudes upwardly beyond the top end of the back rest.

The shaft is statically affixed to the actuator arm such that the shaft simultaneously moves along a vertical path corresponding to a rotary movement of the actuator arm. Such rotary movement of the actuator arm is extended along an arcuate path defined between a maximum of two quadrants. An upper flange is pivotally connected directly to a top one of the shaft end portions and the headrest respectively. Such an upper flange includes pivotally attached first and second sections wherein the second section maintains a static and vertical relationship with the top end of the back rest while the first section selectively adapts between horizontal and vertical positions as the shaft vertically travels between raised and lowered positions respectively. The first portion is preferably disposed horizontally and orthogonal to the shaft when the headrest is articulated to the raised position. Such a first portion is disposed vertically and parallel to the shaft when the headrest is articulated to the lowered position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a perspective view showing an alternate embodiment of the automatic adapting mechanism, in accordance with the present invention;

FIG. 6 is a cross-sectional view of the assembly shown in FIG. 5, taken along line 6-6, showing the headrest adapted to a lowered position; and FIG. 7 is a cross-sectional view of the assembly shown in FIG. 5, showing the head rest adapted to a raised position.

DETAILED DESCRIPTION OF THE INVENTION

Figure 1:
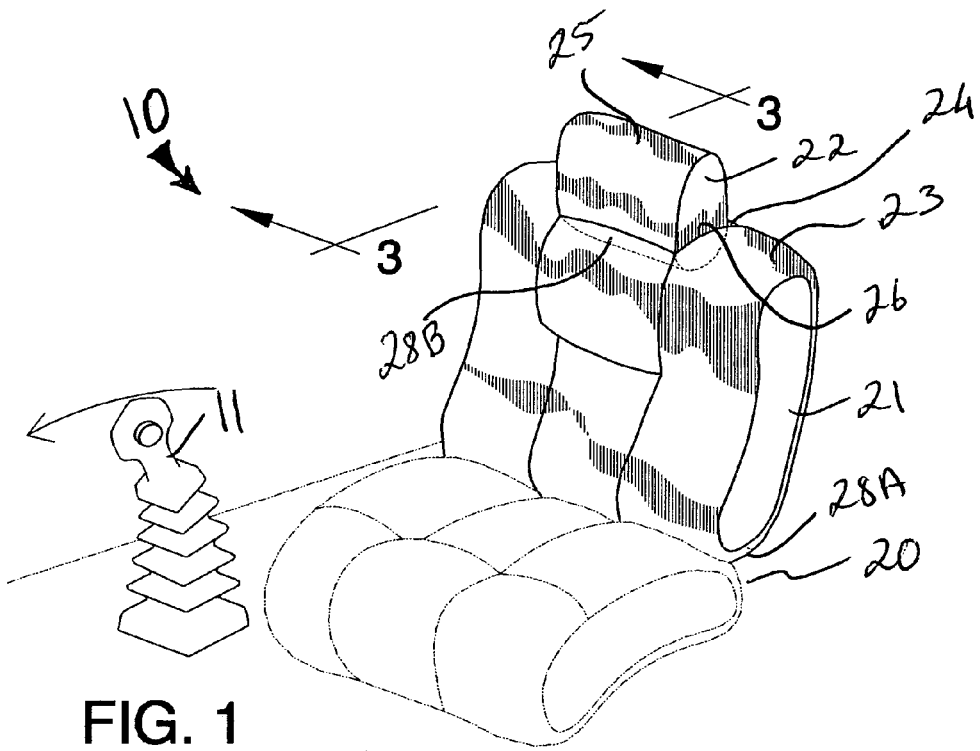
FIG. 1 is a perspective view showing an adjustable vehicle headrest assembly, in accordance with the present invention.
Figure 2:
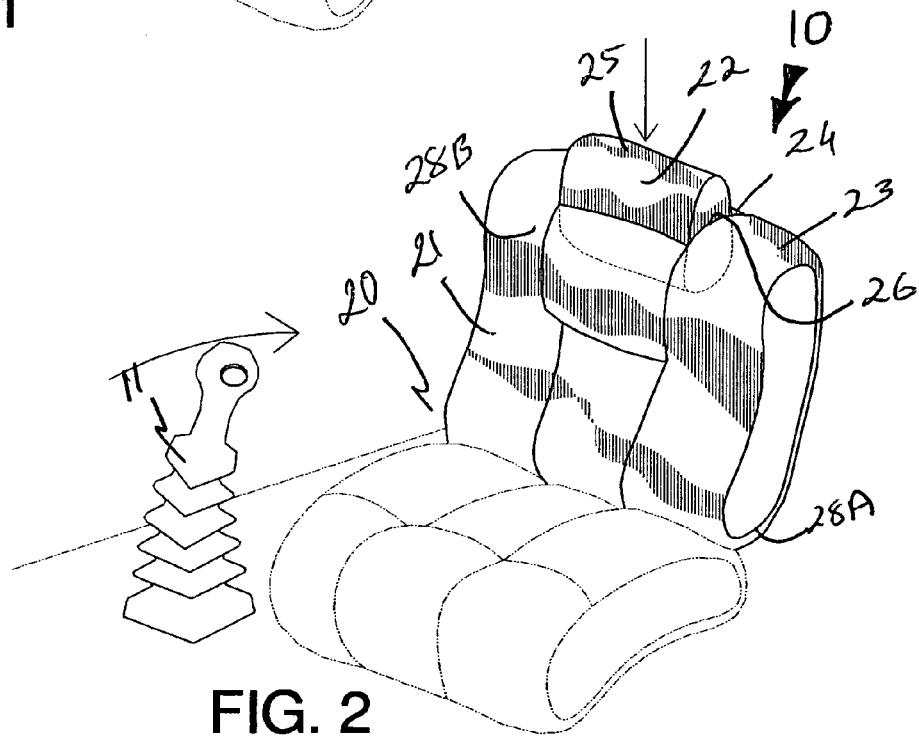
FIG. 2 is a perspective view of the assembly shown in FIG. 1, showing the headrest at a retracted position as the transmission gear shifter is adapted to a reverse position.

The present invention will now be described more fully hereinafter with reference to the accompanying drawings, in which preferred embodiments of the invention is shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to alternate embodiments of such elements.

The assembly of this invention is referred to generally in FIGS. 1-7 by the reference numeral 10 and is intended to provide am adjustable vehicle headrest. It should be understood that the assembly 10 may be used to adjust headrests in many different types of vehicle and should not be limited in use to only family or small passenger vehicles.

Referring initially to FIGS. 1 through 3 and 5 through 6, the apparatus 10 includes a vehicle seat 20 including a vertically oriented back rest 21. A headrest 22 is directly conjoined, without the use of intervening elements, to the back rest 21 and is selectively and conveniently adaptable between raised and lowered positions when a transmission gear shifter 11 of the vehicle is biased between forward and reverse driving positions. The back rest 21 has a chamfered top end 23 provided with a groove 24 that is centrally registered therewith.

Such a groove 24 is suitably sized and shaped for effectively receiving and housing the headrest 22 therein, which is an essential feature for providing an unhindered line of sight to a vehicle operator during while reversing the automobile. The headrest 22 is completely intercalated within the top end 23 of the back rest 21 such that a top edge 25 of the headrest 22 lays horizontally flush with a top opening 26 of the groove 24. Such a headrest 22 is permanently affixed to the automatic adapting mechanism 30 (described herein below).

Figure 4:
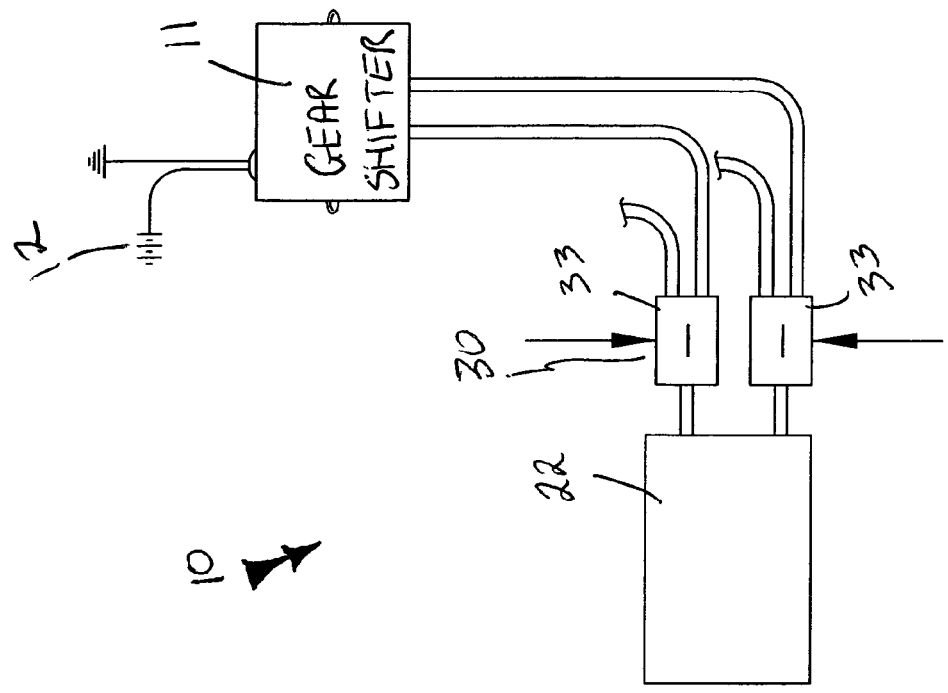
FIG. 4 is a schematic diagram of the automatic adapting mechanism shown in FIG. 3.
Figure 3:
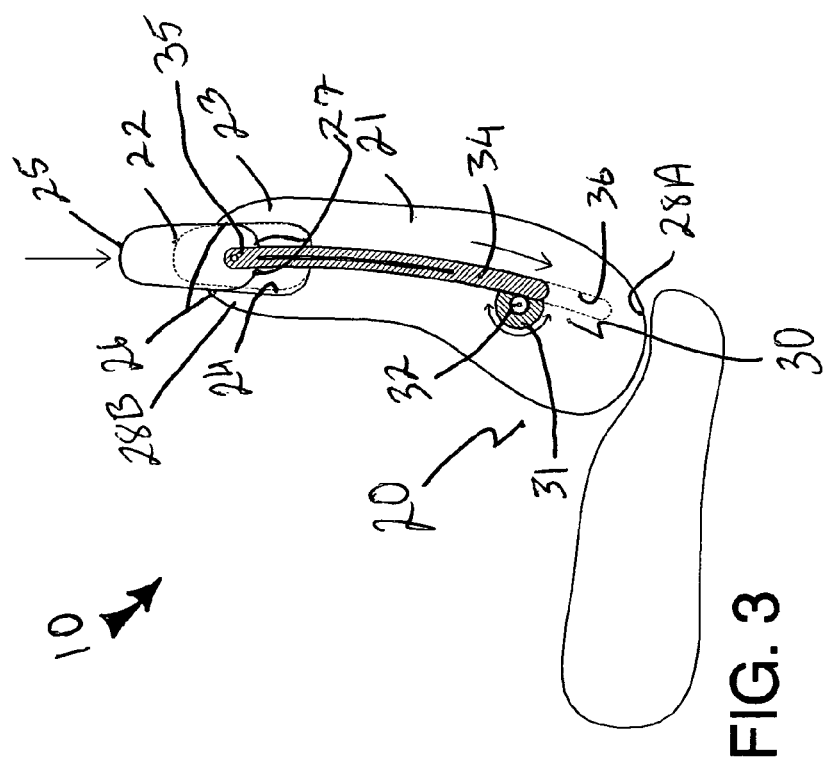
FIG. 3 is a cross-sectional view of the assembly shown in FIG. 1, taken along line 3-3.

Referring to FIGS. 3 and 4, a mechanism 30 is included for advantageously automatically adapting the headrest 22 between the raised and lowered positions when the vehicle is selectively biased between the forward and reverse driving positions, which is critical and advantageous so that a driver can effectively monitor surrounding driving conditions through a rear view window of the vehicle without having to manually recline the headrest 22. Of course, the assembly 10, including the automatic adapting mechanism 30, may be incorporated into both driver and passenger vehicle seats 20, as is obvious to a person of ordinary skill in the art. Such an automatic adapting mechanism 30 is power operated and electrically coupled to an internal power supply source 12 of the vehicle. The automatic adapting mechanism 30 is directly and operably connected, without the use of intervening elements, to the transmission gear shifter 11, which is vital such that the headrest 22 conveniently automatically biases between the raised and lowered positions without requiring the driver to manually reposition the headrest 22 while transitioning the vehicle between the forward and the reverse positions.

Still referring to FIGS. 3 and 4, such an automatic adapting mechanism 30 includes an electric motor 31 that is selectively rotatable about clockwise and counter clockwise directions, which is a crucial feature for limiting the components employed by the assembly 10, thus advantageously requiring the assembly 10 to occupy less space within the vehicle seat 20. The motor 31 includes a drive shaft 32 oriented orthogonal to a vertical path along which the headrest 22 is displaced within the groove 24. The automatic adapting mechanism 30 further includes at least one switch 33 operably mated to the transmission gear shifter 11. Such a switch 33 effectively generates and transmits a control signal to the electric motor 31 when the vehicle is adapted between the forward and reverse positions. Of course, the assembly 10 may also include a switch 33 operably mated to the reverse indicator tail light of the vehicle, as is obvious to a person of ordinary skill in the art.

An elongated and curvilinear guide rail 34 is seated within the back rest 21 and has a top end 35 protruding upwardly through a bottom surface 27 of the groove 24. Such a top end 35 is directly conjoined, without the use of intervening elements, to the headrest 22, which is essential for allowing the headrest 22 to be raised and lowered as the guide rail 34 is raised and lowered, respectively. A hollow track 36 is formed within the back rest 21 and extends along a curvilinear path from a bottom 28A of the back rest 21 upwardly to the groove 24 such that the groove 24 and the track 36 are in fluid communication with each other. The guide rail 34 is interfitted within the track 35 and is operably conjoined directly, without the use of intervening elements, to the electric motor 31 in such a manner that is vital for allowing the guide rail 34 to effectively become vertically offset within the track 36, which is crucial for effectively causing the headrest 22 to adapt between the raised and lowered positions respectively.

Referring to FIGS. 5 through 7, in an alternate embodiment 10', the automatic adapting mechanism 30' includes an elliptical motor 31' that is selectively rotatable about clockwise and counter clockwise directions, which is an important feature for limiting the components employed by the assembly 10, thus advantageously requiring the assembly 10 to occupy less space within the vehicle seat 20. Such a motor 31' includes a drive shaft 32' oriented orthogonal to a vertical path along which the headrest 22' is effectively displaced within the groove 24'.

The elliptical motor 31' further includes an actuator arm 37 that has a linear shape and is provided with axially opposed end portions 38 directly conjoined, without the use of intervening elements, to the drive shaft 32' and radially terminates away therefrom respectively. An elongated shaft 34' is included that has a longitudinal length greater than a longitudinal length of the actuator arm 37. Such a shaft 34' has axially opposed end portions 35' directly conjoined, without the use of intervening elements, to the actuator arm 37 and protrudes upwardly beyond the top end 28B of the back rest 21'.

Referring to FIGS. 6 and 7, the shaft 34' is statically affixed to the actuator arm 37, which is a vital and advantageous feature such that the shaft 34' simultaneously moves along a vertical path corresponding to a rotary movement of the actuator arm 37. Such rotary movement of the actuator arm 37 is extended along an arcuate path defined between a maximum of two quadrants. An upper flange 39 is pivotally connected directly, without the use of intervening elements, to a top one 35A' of the shaft end portions 35' and the headrest 22 respectively. Such an upper flange 39 includes pivotally attached first 41A and second 41B sections wherein the second section 41B maintains a static and vertical relationship with the top end 28B of the back rest 21' while the first section 41A selectively adapts between horizontal and vertical positions as the shaft 34' vertically travels between raised and lowered positions respectively. The first portion 41A is disposed horizontally and orthogonal to the shaft 34' when the headrest 22' is articulated to the raised position. Such a first portion 41A is disposed vertically and parallel to the shaft 34' when the headrest 22' is articulated to the lowered position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A power operated vehicle headrest assembly selectively adjustable between a plurality of alternate positions, said vehicle headrest assembly comprising:
   a vehicle seat including a back rest;
   a headrest directly conjoined to said back rest and selectively adaptable between raised and lowered positions when a transmission gear shifter of the vehicle is biased between forward and reverse driving positions; and
   means for automatically adapting said headrest between said raised and lowered positions when the vehicle is selectively biased between the forward and reverse driving positions such that a driver can effectively monitor surrounding driving conditions through a rear view window of the vehicle without having to manually recline said headrest;
   wherein said automatic adapting means is power operated and electrically coupled to an internal power supply source of the vehicle, said automatic adapting means being directly and operably connected to the transmission gear shifter such that the headrest automatically biases between the raised and lowered positions without requiring the driver to manually reposition the headrest while transitioning the vehicle between the forward and the reverse positions;

wherein said automatic adapting means comprises:
an elliptical motor selectively rotatable about clockwise and counter clockwise directions, said motor including a drive shaft oriented orthogonal to a vertical path along which said headrest is displaced within said groove, said elliptical motor further including an actuator arm having a linear shape and being provided with axially opposed end portions directly conjoined to said drive shaft and radially terminating away therefrom respectively;
an elongated shaft having a longitudinal length greater than a longitudinal length of said actuator arm, said shaft having axially opposed end portions directly conjoined to said actuator arm and protruding upwardly beyond said top end of said back rest, said shaft being statically affixed to said actuator arm such that said shaft simultaneously moves along a vertical path corresponding to a rotary movement of said actuator arm, said rotary movement of said actuator arm being extending along an arcuate path defined between a maximum of two quadrants; and
a upper flange pivotally connected directly to a top one of said shaft end portions and said headrest respectively, said upper flange including pivotally attached first and second sections wherein said second portion maintains a static and vertical relationship with said top end of said back rest while said first section selectively adapts between horizontal and vertical positions as said shaft vertical travels between raised and lowered positions respectively.

2. The assembly of claim 1, wherein said back rest has a chamfered top end provided with a groove centrally registered therewith, said groove being suitably sized and shaped for receiving and housing said headrest therein, said headrest being completely intercalated within said top end of said back seat such that a top edge of said headrest lays horizontally flush with a top opening of said groove.

3. The assembly of claim 1, wherein said first portion is disposed horizontally and orthogonal to said shaft when said headrest is articulated to the raised position, said first portion being disposed vertically and parallel to said shaft when said headrest is articulated to the lowered position.

4. The assembly of claim 1, wherein said automatic adapting means comprises; at least one switch operably mated to said transmission gear shifter, said switch generating and transmitting a control signal to said electric motor when the vehicle is adapted between the forward and reverse positions.

5. A power operated vehicle headrest assembly selectively adjustable between a plurality of alternate positions, said vehicle headrest assembly comprising:
a vehicle seat including a vertically oriented back rest;
a headrest directly conjoined to said back rest and selectively adaptable between raised and lowered positions when a transmission gear shifter of the vehicle is biased between forward and reverse driving positions; and
means for automatically adapting said headrest between said raised and lowered positions when the vehicle is selectively biased between the forward and reverse driving positions such that a driver can effectively monitor surrounding driving conditions through a rear view window of the vehicle without having to manually recline said headrest;
wherein said automatic adapting means is power operated and electrically coupled to an internal power supply source of the vehicle, said automatic adapting means being directly and operably connected to the transmission gear shifter such that the headrest automatically biases between the raised and lowered positions without requiring the driver to manually reposition the headrest while transitioning the vehicle between the forward and the reverse positions;
wherein said automatic adapting means comprises:
an elliptical motor selectively rotatable about clockwise and counter clockwise directions, said motor including a drive shaft oriented orthogonal to a vertical path along which said headrest is displaced within said groove, said elliptical motor further including an actuator arm having a linear shape and being provided with axially opposed end portions directly conjoined to said drive shaft and radially terminating away therefrom respectively;
an elongated shaft having a longitudinal length greater than a longitudinal length of said actuator arm, said shaft having axially opposed end portions directly conjoined to said actuator arm and protruding upwardly beyond said top end of said back rest, said shaft being statically affixed to said actuator arm such that said shaft simultaneously moves along a vertical path corresponding to a rotary movement of said actuator arm, said rotary movement of said actuator arm being extending along an arcuate path defined between a maximum of two quadrants; and
a upper flange pivotally connected directly to a top one of said shaft end portions and said headrest respectively, said upper flange including pivotally attached first and second sections wherein said second portion maintains a static and vertical relationship with said top end of said back rest while said first section selectively adapts between horizontal and vertical positions as said shaft vertically travels between raised and lowered positions respectively.

6. The assembly of claim 5, wherein said back rest has a chamfered top end provided with a groove centrally registered therewith, said groove being suitably sized and shaped for receiving and housing said headrest therein, said headrest being completely intercalated within said top end of said back seat such that a top edge of said headrest lays horizontally flush with a top opening of said groove.

7. The assembly of claim 5, wherein said first portion is disposed horizontally and orthogonal to said shaft when said headrest is articulated to the raised position, said first portion being disposed vertically and parallel to said shaft when said headrest is articulated to the lowered position.

8. The assembly of claim 5, wherein said automatic adapting means comprises: at least one switch operably mated to said transmission gear shifter, said switch generating and transmitting a control signal to said electric motor when the vehicle is adapted between the forward and reverse positions.

9. A power operated vehicle headrest assembly selectively adjustable between a plurality of alternate positions, said vehicle headrest assembly comprising:
a vehicle seat including a vertically oriented back rest;
a headrest directly conjoined to said back rest and selectively adaptable between raised and lowered positions when a transmission gear shifter of the vehicle is biased between forward and reverse driving positions, said headrest being permanently affixed to said automatic adapting means; and
means for automatically adapting said headrest between said raised and lowered positions when the vehicle is selectively biased between the forward and reverse driving positions such that a driver can effectively monitor surrounding driving conditions through a rear view window of the vehicle without having to manually recline said headrest;

wherein said automatic adapting means is power operated and electrically coupled to an internal power supply source of the vehicle, said automatic adapting means being directly and operably connected to the transmission gear shifter such that the headrest automatically biases between the raised and lowered positions without requiring the driver to manually reposition the headrest while transitioning the vehicle between the forward and the reverse positions;

wherein said automatic adapting means comprises:

an elliptical motor selectively rotatable about clockwise and counter clockwise directions, said motor including a drive shaft oriented orthogonal to a vertical path along which said headrest is displaced within said groove, said elliptical motor further including an actuator arm having a linear shape and being provided with axially opposed end portions directly conjoined to said drive shaft and radially terminating away therefrom respectively;

an elongated shaft having a longitudinal length greater than a longitudinal length of said actuator arm, said shaft having axially opposed end portions directly conjoined to said actuator arm and protruding upwardly beyond said top end of said back rest, said shaft being statically affixed to said actuator arm such that said shaft simultaneously moves along a vertical path corresponding to a rotary movement of said actuator arm, said rotary movement of said actuator arm being extending along an arcuate path defined between a maximum of two quadrants; and a upper flange pivotally connected directly to a top one of said shaft end portions and said headrest respectively, said upper flange including pivotally attached first and second sections wherein said second portion maintains a static and vertical relationship with said top end of said back rest while said first section selectively adapts between horizontal and vertical positions as said shaft vertically travels between raised and lowered positions respectively.

10. The assembly of claim 9, wherein said back rest has a chamfered top end provided with a groove centrally registered therewith, said groove being suitably sized and shaped for receiving and housing said headrest therein, said headrest being completely intercalated within said top end of said back seat such that a top edge of said headrest lays horizontally flush with a top opening of said groove.

11. The assembly of claim 9, wherein said first portion is disposed horizontally and orthogonal to said shaft when said headrest is articulated to the raised position, said first portion being disposed vertically and parallel to said shaft when said headrest is articulated to the lowered position.

12. The assembly of claim 9, wherein said automatic adapting means comprises: at least one switch operably mated to said transmission gear shifter, said switch generating and transmitting a control signal to said electric motor when the vehicle is adapted between the forward and reverse positions.

* * * * *